(12) United States Patent
Medvinsky et al.

(10) Patent No.: US 9,184,917 B2
(45) Date of Patent: Nov. 10, 2015

(54) METHOD AND SYSTEM FOR REGISTERING A DRM CLIENT

(75) Inventors: Alexander Medvinsky, San Diego, CA (US); Paul Moroney, La Jolla, CA (US); Rafie Shamsaasef, San Diego, CA (US); Tat Keung Chan, San Diego, CA (US); Madjid F. Nakhjiri, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 157 days.

(21) Appl. No.: 13/170,261

(22) Filed: Jun. 28, 2011

(65) Prior Publication Data

US 2012/0303951 A1 Nov. 29, 2012

Related U.S. Application Data

(60) Provisional application No. 61/490,783, filed on May 27, 2011.

(51) Int. Cl.
*H04L 29/06* (2006.01)
*H04L 9/32* (2006.01)
*G06F 21/10* (2013.01)

(52) U.S. Cl.
CPC .............. *H04L 9/3247* (2013.01); *G06F 21/10* (2013.01); *H04L 9/3265* (2013.01); *H04L 63/123* (2013.01); *H04L 2209/603* (2013.01); *H04L 2463/101* (2013.01)

(58) Field of Classification Search
CPC ......... G06F 21/10; G06F 21/30; G06F 21/60; G06F 21/70; G06F 2221/2129; H04L 2209/603; H04L 2463/101; H04L 63/0823; H04L 63/0428; H04L 9/3247; H04L 9/3263; H04L 9/3265

USPC ......... 713/155–157, 171–173, 168, 189, 193; 726/27; 455/411
See application file for complete search history.

(56) References Cited

U.S. PATENT DOCUMENTS 7,404,082 B2 * 7/2008 Medvinsky et al. .......... 713/168
7,620,809 B2 11/2009 Prologo et al.
(Continued)

FOREIGN PATENT DOCUMENTS

WO 2007028099 A2 3/2007

OTHER PUBLICATIONS

Bogdan C. Popescu et al.: "A DRM Security Architecture for Home Networks", ACM, 2 Penn Plaza, Suite 701—New York USA, Oct. 25, 2004, all pages.
(Continued)

*Primary Examiner* — Thuong Nguyen
(74) *Attorney, Agent, or Firm* — Fenwick & West LLP

(57) ABSTRACT

A client, method and system for registering a DRM client is disclosed. The method (100) includes the steps of: initiating (110) a registration request via a DRM client with an encrypted registration message including an asymmetric key cryptographic identity, a customer identifier and an application specific information (AINFO) field including a digital signature and a device certificate chain; validating (120) information in the application specific information (AINFO) field by a DRM registration server; and receiving (130) a registration response, the registration response being encrypted and including access information, to obtain content. Advantageously, this method provides an enhanced and reliable means of authentication.

17 Claims, 4 Drawing Sheets

(56) References Cited

U.S. PATENT DOCUMENTS

| | | | |
|---|---|---|---|
| 7,734,922 B2* | 6/2010 | Lee et al. ...................... | 713/171 |
| 2002/0161996 A1 | 10/2002 | Koved et al. | |
| 2003/0014629 A1* | 1/2003 | Zuccherato ................... | 713/156 |
| 2006/0068757 A1* | 3/2006 | Thirunarayanan et al. ... | 455/411 |
| 2006/0236097 A1* | 10/2006 | Prologo et al. ................ | 713/156 |
| 2007/0081667 A1 | 4/2007 | Hwang | |
| 2007/0112679 A1* | 5/2007 | Kwon ............................ | 705/51 |
| 2007/0265973 A1 | 11/2007 | Kahn | |
| 2008/0005567 A1* | 1/2008 | Johnson ........................ | 713/172 |
| 2008/0046758 A1* | 2/2008 | Cha et al. ...................... | 713/189 |
| 2009/0046839 A1* | 2/2009 | Chow et al. .............. | 379/142.01 |
| 2009/0210724 A1* | 8/2009 | Hori .............................. | 713/193 |
| 2010/0211793 A1* | 8/2010 | Park et al. ..................... | 713/176 |
| 2012/0100832 A1* | 4/2012 | Mao et al. ..................... | 455/411 |
| 2012/0144195 A1* | 6/2012 | Nair et al. ..................... | 713/168 |

OTHER PUBLICATIONS

Xue Feng et al: "An Efficient Contents Sharing Method for DRM", Consumer Communications and Networking Conference. 2009. CCNC 2009. 6th IEEE. IEEE, Piscataway. NJ. USA, Jan. 10, 2009, pp. 1-5, XP031425477, ISBN: 978-1-4244-2308-8.

Yu-Yi Chen et al: "A Fair-Use DRM System Based on Web Service", Intelligent Systems Design and Applications, 2008. ISDA '08. Eighth International Conference on, IEEE, Piscataway. NJ. USA, Nov. 26, 2008. pp. 11-16. XP031368583, ISBN: 978-0-7695-3382-7.

Chou-Chan Yang et al: "Robust DRM on Internet Based on Identity-Based Encryption", New Trends in Information and Service Science. 2009, NISS '09, International Conference on, IEEE. Piscataway. NJ. USA, Jun. 30, 2009. pp. 1335-1340. XP031530946, ISBN: 978-0-7695-3687-3, all pages.

Patent Cooperation Treaty, International Search Report and Written Opinion of the International Searching Authority for International Application No. PCT/US2012/036875, Jul. 30, 2012, 13 pages.

* cited by examiner

METHOD AND SYSTEM FOR REGISTERING A DRM CLIENT

CROSS-REFERENCE TO RELATED APPLICATION

This application claims priority to U.S. Provisional Application Ser. No. 61/490,783, filed May 27, 2011, and titled, "METHOD AND SYSTEM FOR REGISTERING A DRM CLIENT," the entirety of which is incorporated herein by reference.

FIELD OF THE INVENTION

The field of the invention relates to Method and System for Registering a DRM Client.

BACKGROUND OF THE INVENTION

In many cases, authentication of a client identity takes place with symmetric credentials provided over an encrypted interface. For example, it is common for secure clients to set up a secure connection with a server and then prove user identity through a user name and password. In other cases, a client sends a registration message to a server where the registration message is encrypted with the server's public key and contains client identity and symmetric credentials, such as a password or a pin code. As used herein, the term "symmetric credentials" has its common meaning in the art and generally refers to information which is intended to prove the indentity of a particular client device or a subscriber. Symmetric credentials may include a MAC Address, serial number, IMEI, etc. and usually also includes some secret information such as a password, a pincode or an activation code provided by a network or system operator. These credentials are called "symmetric" because they are generally shared between a client and a system infrastructure component such as a server.

It would be desirable to upgrade and improve these type of systems to verify client identity. In such a case, for example, a database of all client symmetric credentials would not be necessary in the infrastructure and there could be a reduced threat to a database being compromised. When asymmetric credentials are used, the infrastructure would only need a database of public keys that do not require heightened protection.

Also, when public keys are put into a digital certificate, it will not be necessary to pre-provision a database of client keys in the infrastructure. Therefore, the use of asymmetric credentials can simplify system initialization and provisioning. However, existing systems that employ symmetric credentials to validate client identity can be difficult to re-design and upgrade, to support asymmetric authentication. Normally, an existing system would have to be completely re-architected which is not practical.

It would also be considered an improvement in the art, if existing legacy systems which authenticate clients based on symmetric credentials, could be upgraded to use asymmetric credentials or identities as well.

Known conventional prior art legacy systems use symmetric authentication that typically forward client's symmetric credentials to a separate credentials verification system. Instead of using symmetric credentials, it would be considered an improvement in the art to be able to use an asymmetric key cryptographic identity, with for example, a customer identifier, an AINFO field with a client's digital signature and device certificate chain, for authentication. Because the client identity is encrypted together with the rest of the registration message, it would be difficult to perform a cut-and-paste attack and attach these credentials or identity, to some other client's registration request. It would be considered an improvement to be able to upgrade existing legacy systems to be able to authenticate clients based on symmetric credentials and asymmetric key cryptographic identity, in a cost effective and reliable manner.

It would also be considered beneficial, if legacy systems could be easily upgraded to provide and support DRM client authentication based on new or popular device certificates, such as X.509 device certificates.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve the understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Figure 1:
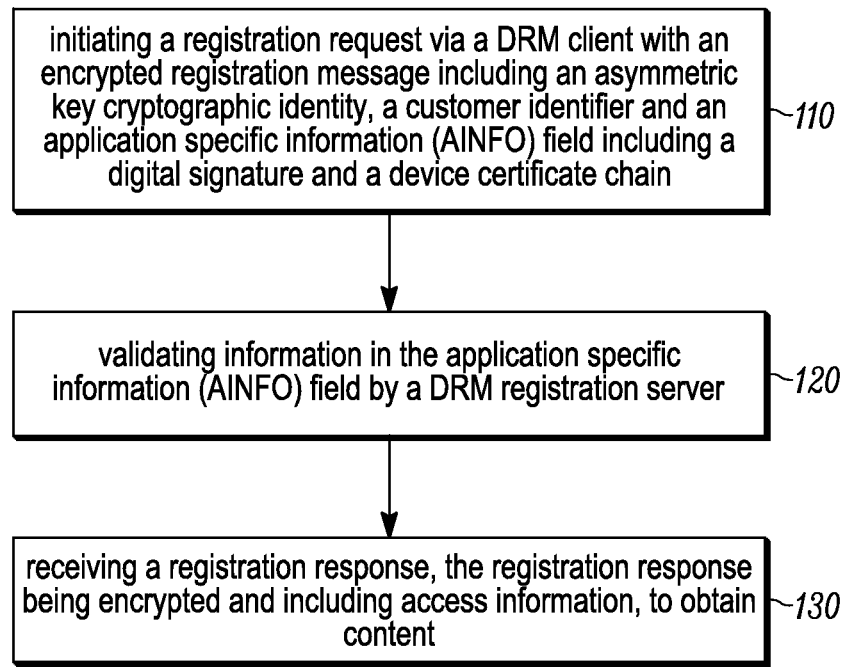
FIG. 1 is a block diagram of a method for registering a DRM Client, according to an embodiment of the present invention.

A method for registering a DRM client is shown in a block diagram in FIG. 1. The method 100 includes the steps of: initiating (110) a registration request via a DRM client with an encrypted registration message including an asymmetric key cryptographic identity, a customer identifier and an application specific information (AINFO) field including a digital signature and a device certificate chain; validating (120) information in the application specific information (AINFO) field by a DRM registration server; and receiving (130) a registration response, the registration response being encrypted and including access information, to obtain content. Advantageously, this method provides an enhanced method to authenticate a DRM client, using asymmetric authentication, for example. Once registered, a "Media Pass" or permission for access a specific piece of content can be provided to a client. Beneficially, a DRM client and DRM registration server can be modified or retrofit, to use an asymmetric authentication method, as detailed below.

In one embodiment, the registration response includes the digital signature being provided over concatenation of at least the customer identifier and the asymmetric key cryptographic identity DEV-PLK which may be the same as the public key CERT-PLK from the client certificate. The customer identifier can be a subscriber name (SN), an end customer identifier, local identifier, device identifier, a MAC address and the like. The actual usage of this parameter may vary for each operator, as should be understood by those skilled in the art.

The encryption in the initiation step 110, can include being a pre-provisioned asymmetric key cryptographic identity of the DRM registration server. For example, a DRM client manufacturer can pre-provision a DRM client with a public key of the DRM registration server.

As background, an entity that is responsible for issuing digital certificates to clients is generally known as a Certificate Authority (CA). For certificate-enabled devices, RSA public/private key pairs (CERT-PLK/CERT-PVK) and the corresponding digital certificates can be generated by manufacturer centers and installed into each device during a manufacturing process. As long as a device has a secure cryptographic identity post manufacture, additional certificates can be downloaded into the device even after it has been fielded.

In a preferred embodiment, the validating step 120 includes verifying the certificate chain. Typically a root certificate authority (CA) certificates are predefined and pre-installed into DRM clients, by a DRM client manufacturer. The root certificate authority (CA) and subordinate certificate authorities (Sub-CA) are verified, in order to receive a registration response 130, to gain access to content, for example. In more detail, validating step 120 can include verifying that a device certificate chain includes a trusted certificate authority, for registration to proceed. The validating step 120 can also include verifying the digital signature, for registration to proceed. And, the validating step 120 can include verifying that a device certificate chain includes an appropriate subordinate certificate authority assigned to a particular device security design or device security level. This feature can examine (based on the name of the subordinate certificate authority) whether a DRM client seeking a registration has sufficient security measures, before issuing or receiving 130 a registration response. As understood by those in the art, an operator would desire to reject registration for a DRM client that fails to have sufficient security measures or can be easily hacked into.

In a preferred embodiment, the asymmetric key cryptographic identity used to sign the initiating step 110 is different from an asymmetric key cryptographic identity DEV-PLK in the receiving step 130 for encrypting the registration response. This can provide enhanced two way security.

The initiating step 110 can include using an X.509 device certificate for authentication can include a public key CERT-PLK. In a preferred embodiment, the initiating step can include a DRM client and DRM registration server using X.509 device certificates for authentication. The X.509 device certificate is compliant with the RFC 5280, entitled Internet X.509 Public Key Infrastructure Certificate and Certificate Revocation List (CRL) Profile.

In one case, the method 100 can further comprise validating the customer identifier for authorization to be registered for a DRM service. This feature provides an additional parameter and feature to verify, before receiving a registration response in step 130.

In a preferred embodiment, the method 100 defines asymmetric authentication. As previously noted, many prior art systems use symmetric authentication that typically forward client's symmetric credentials to a separate credentials verification system. Instead of using symmetric credentials, advantageously, utilizing an asymmetric key cryptographic identity, enables the use of public keys, with for example, a customer identifier, an AINFO field client's digital signature and device certificate chain, for authentication. Because the client credentials are encrypted together with the rest of the registration message, it would be difficult to perform a cut-and-paste attack and attach these credentials to some other client's registration request. Advantageously, the asymmetric authentication message can be used to help upgrade existing legacy systems which authenticate clients based on symmetric credentials, to also use asymmetric key cryptographic identities, as detailed here. Requests from both types of clients can all be directed to the same DRM Registration Server 212.

In one embodiment, the method further includes performing a subscriber verification by checking the customer identifier. For example, a subscriber verification server or module can be utilized to verify subscriber information and return a subscriber authorization status, such as a success or failure. This feature can provide enhanced security, before granting registration, issuing a media pass or receiving a registration response in step 130.

Figure 2:
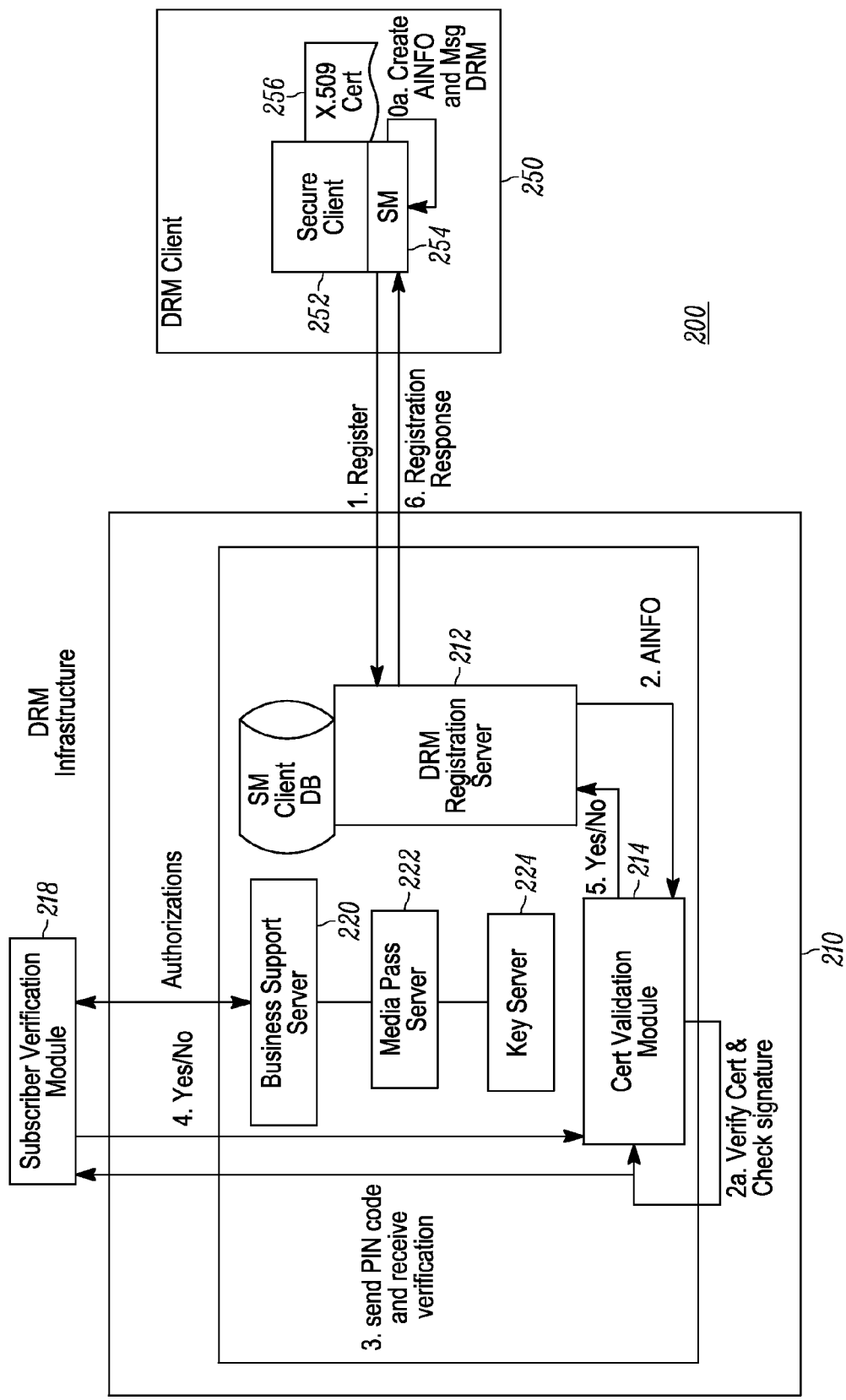
FIG. 2 is a block diagram of an exemplary DRM system architecture including DRM infrastructure and a DRM client, according to an embodiment of the present invention.

Turning now to FIG. 2, a DRM system architecture 200 is shown. It can be used to register a client. FIG. 2 shows a DRM infrastructure 210 and DRM client 250. The system 200 can include: a DRM registration server 212 configured to receive a registration request (at line 1) with an encrypted registration message including an asymmetric key cryptographic identity, a customer identifier and an application specific information (AINFO) field including a digital signature and a device certificate chain; and a certificate validation module 214 configured to validate information in the application specific information (AINFO) field, the DRM registration server 212 configured to send a registration response (at line 6), the registration response (line 6) being encrypted and including access information, to obtain content.

Access information, for example, can include access to DRM protected content. It can include identity and connection information, such as a URL of a DRM Server, public key of the server and RN (Registration Number) or session identification, for example. A Media Pass Server 222 can issue a "Media Pass" to each client in possession of this access information, where the Media Pass is essentially a permission to access a specific piece of content.

Advantageously, the system 200 provides an enhanced method to authenticate a DRM client 250. In a preferred embodiment, the system 200 can include the DRM registration server configured to receive symmetric credentials-based AINFO and asymmetric key cryptographic identity-based AINFO and pass each type of AINFO to a corresponding validation module.

In more detail, in one embodiment, the DRM registration server is configured to: pass AINFO from all registration requests to at least a first validation module for verification, wherein the first validation module determines if AINFO is built with symmetric credentials or with an asymmetric key cryptographic identity; perform AINFO verification for each AINFO built with symmetric credentials; and pass AINFO built with an asymmetric key cryptographic identity to a second validation module for verification. Alternatively, the DRM registration server can be configured to: pass AINFO from all registration requests to at least a first validation module for verification, wherein the first validation module determines if AINFO is built with symmetric credentials or with an asymmetric key cryptographic identity; perform AINFO verification for each AINFO built with an asymmetric key cryptographic identity; and pass AINFO built with symmetric credentials to the second validation module for verification.

Figure 3:
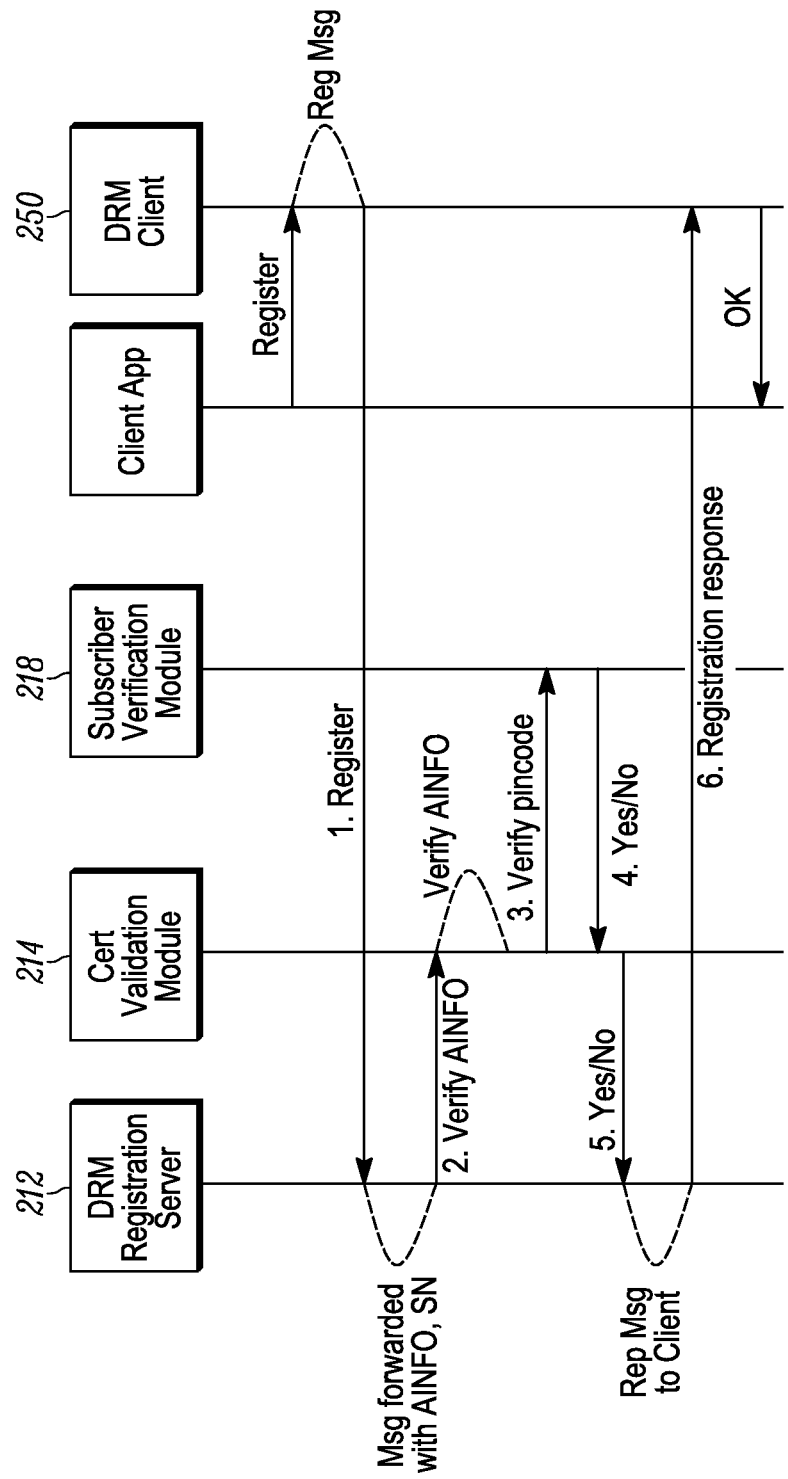
FIG. 3 is an exemplary sequence diagram of a DRM system, according to an embodiment of the present invention.

Turning to FIG. 3, an application server which processes DRM client certificates is called a certificate validation module (CVM) 214. The CVM 214 includes validating information in the application specific information (AINFO) field including: (i) a digital signature and (ii) a device certificate.

In more detail, the CVM 214 can verify the certificate chain by verifying a root certificate authority (CA) certificate and subordinate certificate authority (Sub-CA) certificates. The root certificate authority (CA) certificate can be predefined and pre-installed into the CVM 214. Typically, there is a different Subordinate Certificate Authority (Sub-CA) certificate assigned to a different class of devices. Based on a given Sub-CA certificate, some categories of devices may be rejected by an operator due to an insufficient level of security.

In one embodiment, the asymmetric key cryptographic identity used in the signing of the registration message by the DRM client 250 (line 1) is different from a public key identity DEV-PLK in the encryption of the registration response by the DRM registration server 212 (line 6). The two public key identities of the device may be protected at a different robustness level or one may be protected in software while the other credential may be protected in hardware.

As shown in FIG. 2, the DRM registration server 212 is configured to use a X.509v3 device certificate 256 for authentication. As should be understood, other device certificate formats may be utilized.

As shown in FIG. 2, the CVM 214 is configured to validate information in the application specific information (AINFO) field including verifying the device certificate chain and the digital signature (shown as line 2a). Advantageously, if the device certificate chain and digital signature are verified, registration can proceed, and if not, registration will not proceed.

The system 200 can further include a subscriber verification module (SVM) 218 to verify customer additional symmetric subscriber credentials which may be operator specific and may include a password and a customer identity. Beneficially, this feature provides an operator with the ability to verify the identity of both a client device and a human subscriber entering a password, before a DRM client 250 receives a registration response, at line 6. At line 4, the local symmetric subscriber credentials are verified as yes or no. At line 5, the answer, yes or no, is passed to the DRM registration server 212. This embodiment allows an operator, a chance to accept or decline the registration request based on its own criteria, by for example, using a subset of AINFO data that the operator's software generated on the DRM client 250. Typically, there is a different Subordinate Certificate Authority (Sub-CA) certificate assigned to a different class of devices. Based on the Sub-CA certificate, some categories of devices may be rejected by an operator due to an insufficient level of security. As shown in FIG. 2, the CVM 214 is an application server which processes DRM client certificates and verifies whether a DRM client has a sufficient level of security.

| Acronym | Description |
| --- | --- |
| AINFO | Application specific Information |
| CA | Certificate Authority |
| CVM | Certificate Validation Module |
| DRM | Digital Rights Management |
| RS | DRM Registration Server |
| HUID | Hardware Unique Identifier |
| SM | Secure Media |
| Sub-CA | Subordinate Certificate Authority |

In more detail, in FIGS. 2 and 3, a DRM client 250 sends a registration message via line 1 to a DRM registration server 212. This message via line 1 is encrypted, preferably using a pre-provisioned DRM Registration Server's public key. The DRM registration server 212 processes the message. It communicates via line 2 with a CVM 214 to verify the DRM client 250 provisioning status. As previously detailed, the registration message at line 1, includes an AINFO field. At line 2a, the digital signature and a device certificate chain certificate is shown verified and checked. In this manner, the DRM Registration Server 212 does not need to understand the format of AINFO and does not require the ability to process device certificates and signatures. At line 3, the local operator-specific credentials are forwarded to the SVM 218 from the CVM 214. The SVM 218 can be an operator's application server that verifies subscriber information, such as it checks a pincode or password, for example. Once verified in SVM 218, a subscriber authentication and authorization status, which can be success or failure (Yes or No), verification message is forwarded back to the CVM 214 via line 4. The CVM 214 forwards a verification message, such as a Yes or No, back to the DRM registration server via line 5. In more detail, the CVM 214 returns a Yes, to both signature verification and pincode verification succeeded. Otherwise it will return a No. If the verification message returns a Yes, a registration response via line 6 is forwarded to the DRM client 250.

At line 6, the DRM registration server 212 can complete its client registration process by sending back a response encrypted with a device public key DEV-PLK to the DRM client. This concludes the certificate-based registration process.

Once registration is complete, a media pass or permission for access to a specific piece of content can be provided to a client.

In one embodiment, the DRM registration server 212 can perform some further validation on the client request message, at line 1, such as verifying and mapping of customer identifier to device identification. The mapping is rejected if there was a previous registration with the same device identification but different customer identifier.

FIG. 2 also shows a business support server 220, media pass server 222 and key server 224, for providing enhanced business support, media passes and content decryption keys, respectively.

Also shown in FIG. 2, the DRM Client 250 can comprise a secure client 252, DRM Module 254, and a device certificate 256, such as an X.509 device certificate. The DRM client 250 can include creating an AINFO and DRM message, as shown by line 0a.

Figure 5:
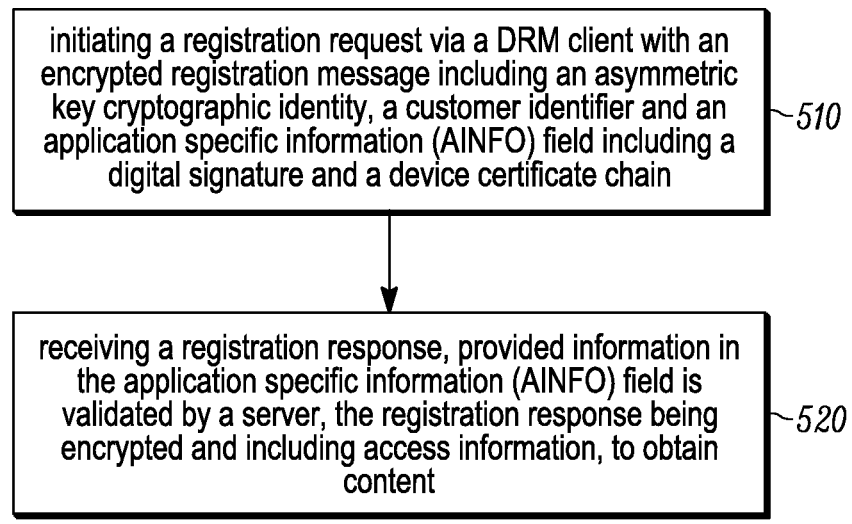
FIG. 5 is an exemplary block diagram of a method for registering a DRM Client, according to an embodiment of the present invention.

Turning to FIG. 5, a block diagram of another method 500 for registering a DRM client is shown. The method 500 includes the steps of: initiating 510 a registration request via a DRM client with an encrypted registration message including an asymmetric key cryptographic identity DEV-PLK, a customer identifier and an application specific information (AINFO) field including a digital signature and a device certificate chain; and receiving 520 a registration response, provided information in the application specific information (AINFO) field is validated by a server, the registration response being encrypted and including access information, to obtain content.

Advantageously, the method 500 provides an enhanced way to authenticate a DRM client 250, using asymmetric authentication. The method can help to provide improved authentication between a DRM client and DRM registration server using asymmetric authentication and device certificates, such as X.509 device certificates. In a preferred embodiment, the validated information in the application specific information (AINFO) field includes verifying the device certificate chain and the digital signature. Advantageously, if the device certificate chain and digital signature are verified, registration can proceed, and if not, registration will not proceed, as previously detailed In one aspect, a DRM client 250 is shown in the figures. The DRM client 250 can be configured to initiate a registration request with an encrypted registration message including an asymmetric key cryptographic identity, a customer identifier and an application specific information (AINFO) field including a digital signature and a device certificate chain (similar to as shown in 510 in FIG. 5) and receive a registration response, provided information in the application specific information (AINFO) field is validated by a server, the registration response being encrypted and including access information, to obtain content (similar to as shown in 520). Advantageously, the DRM client 250 is configured to provide an enhanced way to become authenticated, as detailed herein.

The DRM client 250, methods 100 and 500 and system 200 can use a specific format of AINFO which includes a device certificate chain, such as a X.509v3 device certificate chain and digital signature, which can be used to validate: the customer identifier, device public key contained in the X.509 certificate and establish that a DRM client as an authentic device with a sufficient level of hardware security.

Figure 4:
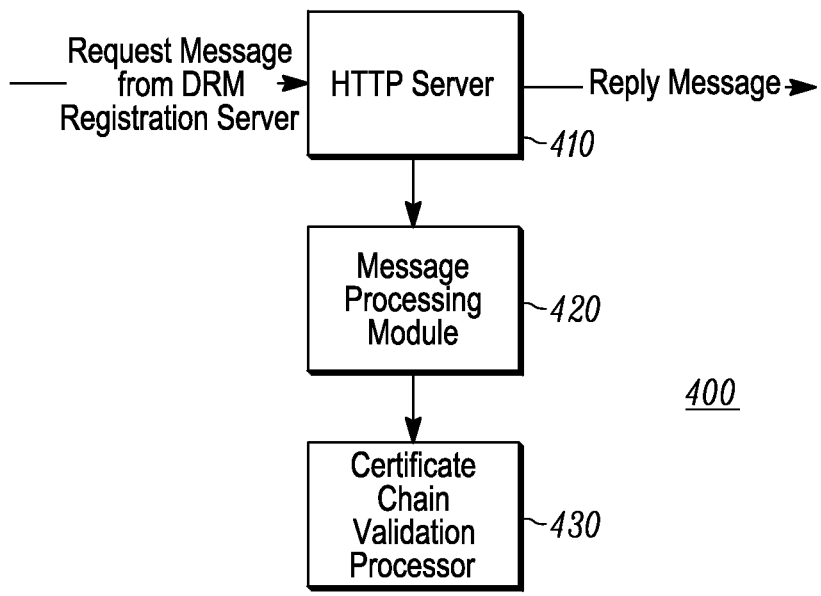
FIG. 4 is an exemplary block diagram of a certificate validation module, according to an embodiment of the present invention.

At FIG. 4, an exemplary block diagram of a certificate validation module (CVM) 400 (also shown as item 214 in FIG. 2) is shown. The CVM 400 can be a web component, standalone or co-hosted with the DRM registration server 212. The CVM 400 is shown as a generic web server capable of processing AINFO and other parameters forwarded by the DRM registration server 212. It can include a HTTP server 410, message processing module 420 and a certificate chain validation processor 430.

In more detail, the HTTP server 410 can be configured to process incoming HTTP packets containing DRM registration server messages. It can extract AINFO and other relevant fields out of the HTTP request message and pass them to the message processing module 420.

The message processing module 420 can parse an HTTP message and forward the relevant parameters (AINFO, device public key DEV-PLK, device identifier and customer identifier) to the certificate chain validation processor 430. The validation processor verifies this set of registration parameters (including the AINFO field with a digital signature and device certificate chain) and creates a YES or NO response. In one embodiment, it can forward messages to a third party SVM 218. The format of a request to the SVM 218 can include the format of a request sent to CVM 214, except that AINFO will be modified to contain only operator-specific subscriber information, such as the customer identifier and a pincode or a password. For example, the device signature and certificate chain is not necessary to be forwarded to SVM.

The CVM 400 can be a server that is provisioned with a root CA certificate before deployment in order to perform certificate chain validation processing. It may be co-hosted with the DRM registration server 212.

Figure 6:
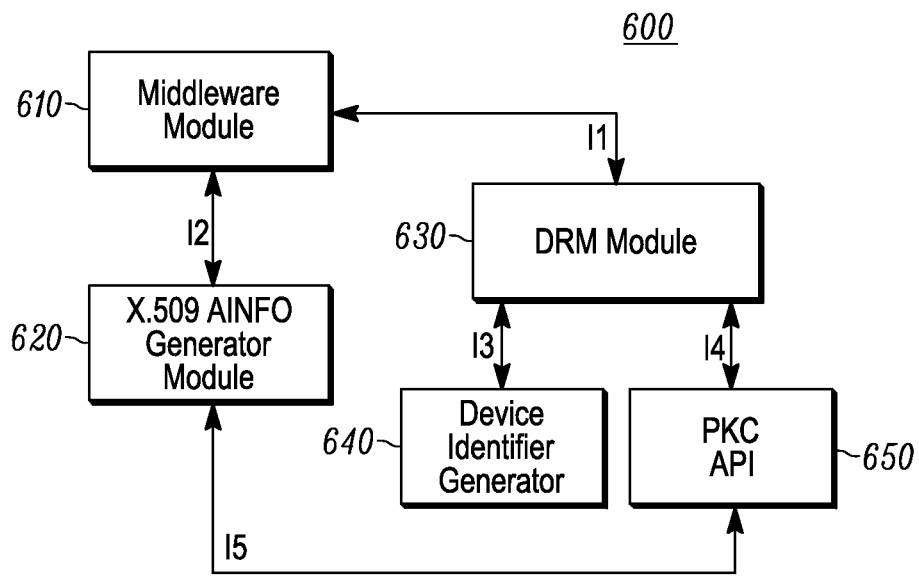
FIG. 6 is an exemplary block diagram of client side components, according to an embodiment of the present invention.

Turning to FIG. 6, exemplary client side components 600 are shown. In one embodiment, a X.509 device certificate is used and secure middleware invokes the use of a DRM Module 630, and it is called middleware module 610. The middleware module 610 has a local HTTP-based interface I1 to the DRM Module 630, and is connected over a localhost IP interface. For the purpose of DRM registration, the middleware module 610 obtains AINFO information from a X.509 AINFO Generator module (AGM) 620 over interface I2 and passes it along with other information to the DRM Module 630. A customer register command sent over interface I1 can include the following parameters: Customer Identifier, URL of the DRM Registration Server and AINFO.

The AGM 620 is a software component which is invoked by the middleware module 610 and is responsible for creating the data blob going inside the AINFO field. It takes as inputs Customer Identifier, device identifier and Operator-specific information such as pincode or password. It is configured to generate an AINFO blob and return it to the middleware module 610 over interface I2. This same AINFO is then passed on to the DRM Module 630 over interface I1 and inserted into an DRM registration message to be sent to the DRM registration server. A device identifier generator 640 is shown and includes a software component that parses the X.509 device certificate in order to extract a device hardware identifier (HUID) from a CommonName attribute of the certificate subject name. The resulting HUID value is returned to the DRM Module 630 and middleware module 610 software over the I3 interface. A Secure Public Key Crypto API 650 is a software component that provides some hardware security and protection of a device private key. Typically, a private key is in a secure container and cannot be returned directly over the interface I4. Instead, interface I4 allows requests to perform private key-based decrypt on data that has been sent to the client device encrypted with its public key. Interface I4 is client platform specific.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

The invention claimed is:

1. A method, comprising:
receiving, by a digital rights management (DRM) registration server including a processor, an encrypted registration message from a DRM client device, the encrypted registration message having been encrypted using a first asymmetric key cryptographic identity and including a customer identifier and asymmetric credentials, wherein the asymmetric credentials include the first asymmetric key cryptographic identity, a digital signature, and a device certificate chain;
passing, by the DRM registration server, contents of the encrypted registration message to at least one validation module, the at least one validation module being coupled to the DRM registration server;
validating, by the at least one validation module, the digital signature and the device certificate chain, said validation including verifying that the device certificate chain includes a trusted certificate authority;
responsive to validation of the digital signature and the device certificate chain, encrypting, by the DRM registration server, a registration response using a second asymmetric key cryptographic identity to produce an encrypted registration response, the registration response including access information to enable the DRM client device to obtain media content; and sending, by the DRM registration server, the encrypted registration response to the DRM client device.

2. The method of claim 1, wherein the registration response includes the digital signature being provided over concatenation of at least the customer identifier and the second asymmetric key cryptographic identity.

3. The method of claim 1, wherein the first asymmetric key cryptographic identity is pre-provisioned in the DRM client device.

4. The method of claim 1, wherein the first asymmetric key cryptographic identity is different than the second asymmetric key cryptographic identity.

5. The method of claim 1, wherein the device certificate chain is an X.509 device certificate chain.

6. The method of claim 1, further comprising:
validating the customer identifier.

7. The method of claim 1, wherein validating the device certificate chain includes verifying that the device certificate chain includes an appropriate subordinate certificate authority assigned to a particular device security level.

8. The method of claim 7, wherein the particular device security level defines a level of hardware security.

9. A system, comprising:
a processor; and
a memory communicatively coupled to the processor, the memory having stored therein computer-executable instructions, comprising:
   a DRM registration server component configured to receive an encrypted registration message from a DRM client device, the encrypted registration message including a customer identifier and asymmetric credentials encrypted using a first asymmetric key cryptographic identity, wherein the asymmetric credentials include the first asymmetric key cryptographic identity, a digital signature, and a device certificate chain; and
   at least one validation component coupled to the DRM registration server component, the at least one validation component configured to:
      receive contents of the encrypted registration message from the DRM registration server component;
      determine whether the contents of the encrypted registration message include asymmetric credentials or symmetric credentials;
      in response to a determination that the contents of the encrypted registration message include asymmetric credentials, validate the digital signature and the device certificate chain, wherein validation includes verifying that the device certificate chain includes a trusted certificate authority;

wherein the DRM registration server component is further configured to, in response to validation of the digital signature and the device certificate chain:
   encrypt a registration response using a second asymmetric key cryptographic identity to produce an encrypted registration response, the registration response including access information to enable the DRM client device to obtain media content; and
   send the encrypted registration response to the DRM client device.

10. The system of claim 9, wherein the at least one validation module includes a subscriber verification module to verify the customer identifier.

11. The system of claim 9, wherein the device certificate chain is an X.509 device certificate chain.

12. The system of claim 9, wherein the validation module is further configured to verify that the device certificate chain includes an appropriate subordinate certificate authority assigned to a particular device security level.

13. The system of claim 12, wherein the particular device security level defines a level of hardware security.

14. A method, comprising:
encrypting, by a digital rights management (DRM) client device including a processor, a registration message using a first asymmetric key cryptographic identity to produce an encrypted registration message, the registration message including a customer identifier and asymmetric credentials, wherein the asymmetric credentials include the first asymmetric key cryptographic identity, a digital signature, and a device certificate chain;
sending, by the DRM client device, the encrypted registration message to the DRM registration server;
receiving, by the DRM client device, an encrypted registration response from the DRM registration server responsive to the registration message, the encrypted registration response having been encrypted using a second asymmetric key cryptographic identity e, and including access information to enable the DRM client device to obtain media content; and
decrypting, by the DRM client device, the encrypted registration response to retrieve the access information.

15. The method of claim 14, wherein the device certificate chain is an X.509 device certificate chain.

16. The system of claim 14, wherein the device certificate chain includes an appropriate subordinate certificate authority assigned to a particular device security level.

17. The system of claim 16, wherein the particular device security level defines a level of hardware security.

* * * * *